Sept. 15, 1964   E. J. DE RIDDER   3,148,796
CONTAINER STRUCTURES
Filed Oct. 19, 1960   4 Sheets-Sheet 1

INVENTOR
ERNST J. DeRIDDER
BY *Glenn & Jackson*
HIS ATTORNEYS

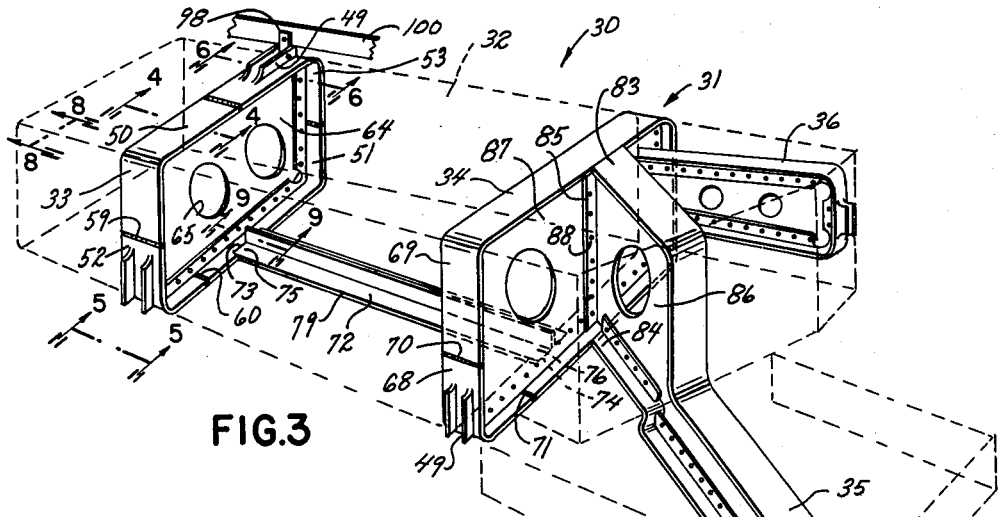
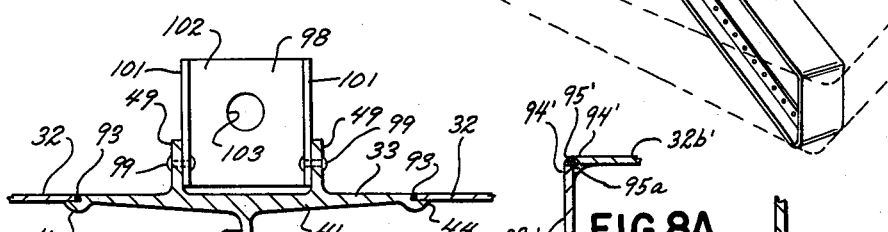
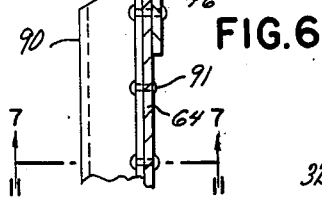
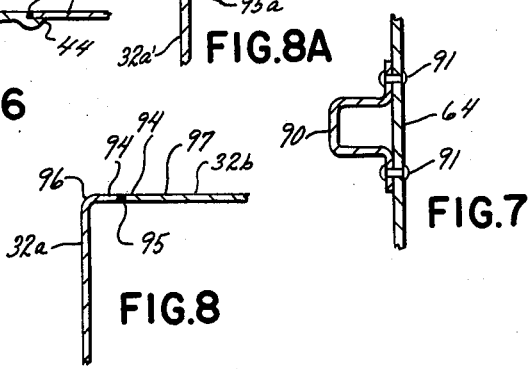
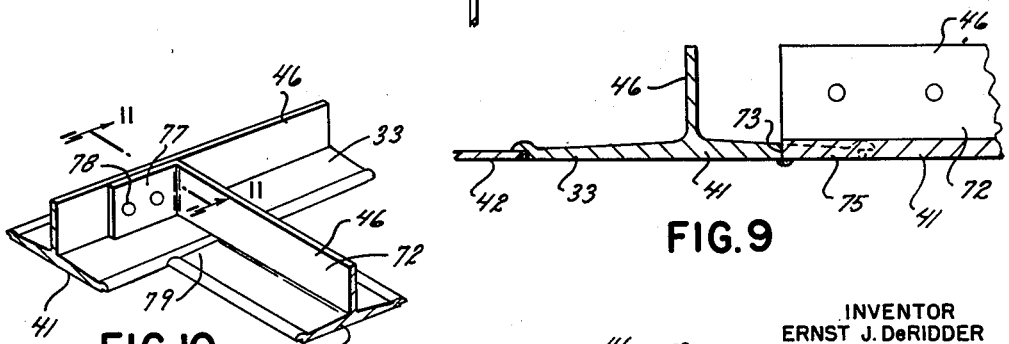
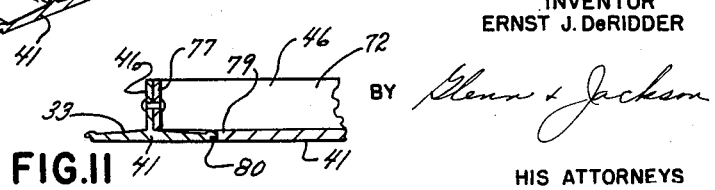
INVENTOR
ERNST J. DeRIDDER
HIS ATTORNEYS

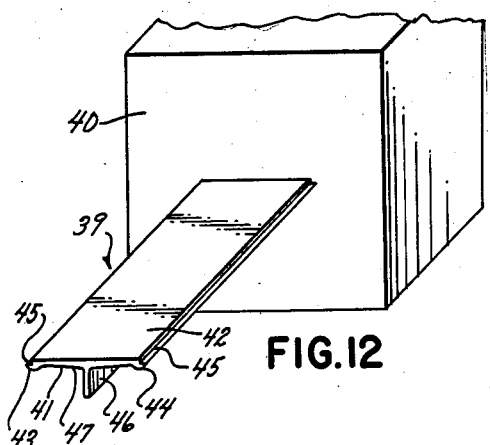
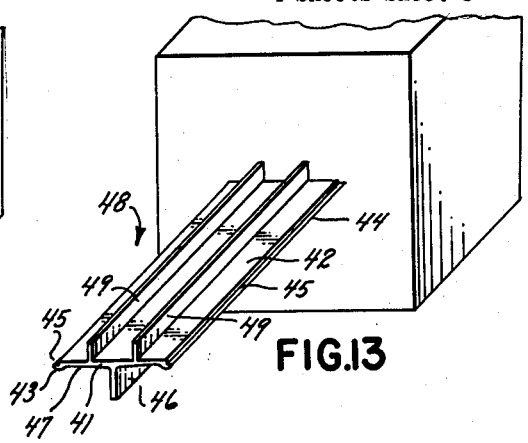
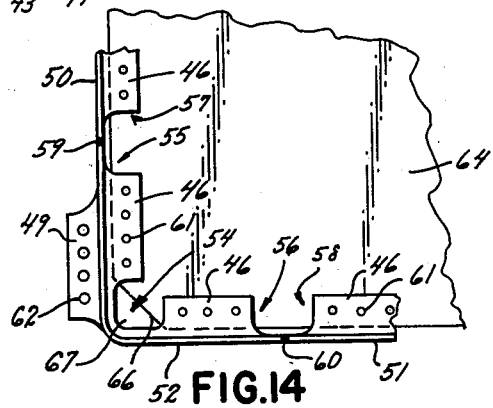
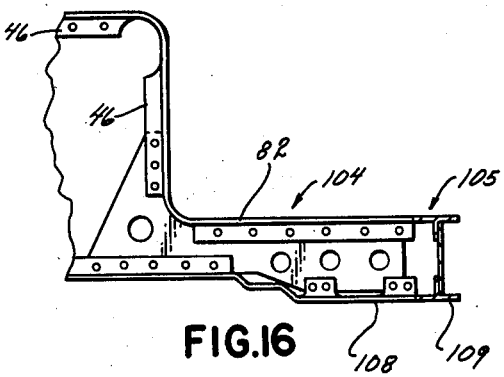
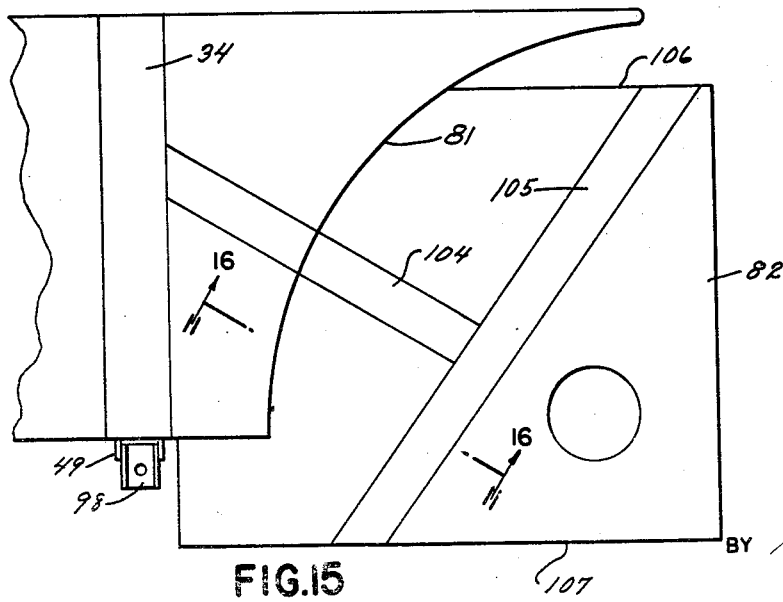
INVENTOR
ERNST J. DeRIDDER
HIS ATTORNEYS INVENTOR
ERNST J. DeRIDDER

HIS ATTORNEYS

United States Patent Office 3,148,796
Patented Sept. 15, 1964

3,148,796
CONTAINER STRUCTURES
Ernst J. De Ridder, Henrico County, Va., assignor to Reynolds Metals Company, Richmond, Va., a corporation of Delaware
Filed Oct. 19, 1960, Ser. No. 63,606
6 Claims. (Cl. 220—5)

This invention relates to containers for fuel and the like and to the method of making such containers or the like. This invention also relates to frame constructions for such containers or the like and to the method of making such frame constructions.

Heretofore, many different types of metal container constructions have been made to be utilized for fuel cells for aircraft, military tanks, and other vehicles. Because of the design characteristics of such vehicles, the fuel tanks or cells are constructed to conform to the structural configurations of various compartments in the vehicle in order to utilize as much of the available space in the vehicle as is possible for storing fuel. Thus, such containers or fuel cells normally have irregularly shaped contours.

Generally, such containers or fuel tanks are each formed by welding together a plurality of preformed metal skin elements to provide the outer, irregular peripheral surface of the container. Baffle means or other frame members are welded to the interior surfaces of the skin elements and span the interior of the container to tend to add rigidity to the container. The container is subsequently mounted to the supporting structure of the vehicle or the like by suitable brackets connected to the outer surface of the skin elements.

It has been found that not only do adverse stress concentrations result at the weld seams of the skin elements through subsequent vibration of the skin elements and/or impact shocks transferred thereto by the moving vehicle, but also such adverse stress concentrations result at the weld joints between the internal frame members and the skin elements. Such stress concentrations result in fatigue of the weld seams and joints and, thus, in early failure of the container.

To compensate for this adverse stress concentration feature, manufacturers have constructed such fuel cells or containers out of relatively thick skin elements formed of steel and the like. However, the resulting containers added appreciably to the weight of the vehicle. Further, it was found that to form irregularly-shaped containers from relatively thick sheets of metal not only added to the cost of such containers from the standpoint of the additional metal alone, but also because a greater amount of time-consuming piecing and welding was required to form the irregular contours of the containers, as it is more difficult to form or stamp a relatively thick metal sheet into the desired configuration than a relatively thin sheet.

According to the teachings of this invention, however, an irregularly-shaped fuel cell or container is provided wherein relatively light-weight and relatively thin skin elements are interconnected together in such a manner that the aforementioned stress concentrations are reduced to at least a desirable degree or completely eliminated, whereby the container of this invention has a relatively long life and is relatively light-weight in comparison with prior known containers.

The various parts of the container of this invention are made in a simple and effective manner and are so assembled together by the methods of this invention that not only are the resulting containers relatively simple and inexpensive to manufacture, but also the resulting containers are substantially fatigue-proof, light-weight, and long-lasting.

In general, the various containers of this invention each comprises a relatively rigid frame construction that not only provides the structural strength for the container but also part of the outer peripheral surface thereof. The frame construction is made from simple metal extrusions that are subsequently bent into the desired configurations and rigidly secured together, certain of the bent frame members having baffle means interconnected thereto and spanning the configurations defined thereby to further rigidify the frame construction. Thereafter, the metal skin elements are welded or otherwise secured to the frame construction to provide the remainder of the outer peripheral surface of the container.

The thus formed container is subsequently secured to the supporting structure of the vehicle by brackets or the like connected to the frame construction whereby only the frame construction bears the impacts and shocks transmitted to the container by the moving vehicle and thereby isolates such shocks from the weld seams of the skin elements. Further, should various vibrations be set up in certain parts of the skin elements, the frame construction isolates such vibrations from the other parts of the container so that concentrated vibrations cannot exist in the container of this invention. Thus, concentrated stresses are eliminated or substantially reduced at the critical areas in the containers of this invention so that the same are relatively long-lasting and fatigue-proof and can be formed of desirable light-weight material.

Accordingly, it is an object of this invention to provide an improved container or fuel cell having one or more of the novel features set forth above and hereinafter shown or described.

Another object of this invention is to provide an improved method for making such a container or the like.

A further object of this invention is to provide an improved frame construction for such a container or the like.

Another object of this invention is to provide an improved method for making such a frame construction or the like.

Another object of this invention is to provide an improved means for securing such a container or the like to a supporting structure.

Other objects, uses and advantages of this invention are apparent from a reading of this description which proceeds with reference to the accompanying drawings forming a part thereof and wherein:

FIGURE 3 is an enlarged schematic view illustrating in a simplified manner the frame construction of the container of FIGURE 1 in full lines and the skin elements or wall means thereof in dotted lines.

FIGURE 6 is an enlarged, fragmentary, cross-sectinal view of another portion of the frame construction of the container of FIGURE 3 and is taken on line 6—6 thereof.

FIGURE 7 is a cross-sectional view taken on line 7—7 of FIGURE 6 and illustrates the baffle stiffening means of this invention.

FIGURE 8 is a fragmentary, cross-sectional view of the skin elements or wall means of the container illustrated in FIGURE 3 and is taken substantially on line 8—8 thereof.

FIGURE 8A is a view similar to FIGURE 8 and illustrates another embodiment of this invention.

FIGURE 9 is an enlarged, fragmentary, cross-sectional view taken on line 9—9 of FIGURE 3 and illustrates one method of interconnecting together the various frame members of the frame construction.

FIGURE 10 is a fragmentary perspective view similar to FIGURE 9 and illustrates another method of this invention for interconnecting together adjacent frame members of the various containers of this invention.

FIGURE 11 is a fragmentary, cross-sectional view taken on line 11—11 of FIGURE 10.

FIGURE 12 is a perspective, schematic view illustrating the method of forming one of the frame member stocks of this invention.

FIGURE 13 is a view similar to FIGURE 12 and illustrates the method of forming another frame member stock of this invention.

FIGURE 14 is an enlarged, fragmentary, side view illustrating one method of this invention for forming part of the frame construction of the container illustrated in FIGURE 3.

FIGURE 15 is a top, simplified view of a portion of the container illustrated in FIGURE 1.

FIGURE 16 is a fragmentary, cross-sectional view of the container construction illustrated in FIGURE 15 and is taken substantially on line 16—16 thereof.

Figure 1:
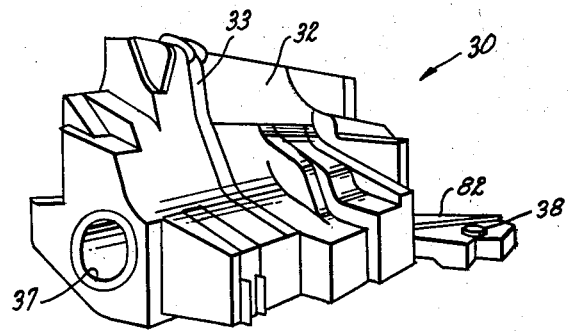
FIGURE 1 is a perspective view of one embodiment of the fuel container of this invention.

While the various container constructions, frame constructions, frame members, and methods of this invention are hereinafter described in connection with fuel cells for vehicles and, in particular, in connection with fuel cells for military weapons carrier, such as a tank or the like, it is to be understood that the same are equally applicable to containers and structures utilized for other purposes. Therefore, the various features of this invention are not to be limited to only the applications illustrated in the drawings and described, because the same have a wide variety of uses, as is hereinafter apparent.

Referring to FIGURE 1, an improved fuel container of this invention is generally indicated by the reference numeral 30 and includes a relatively rigid frame construction, illustrated in a simplified form by full lines in FIGURE 3 and generally indicated by the reference numeral 31, to which the skin elements or wall means 32 are secured to complete the outer peripheral surface of the container 30.

The frame construction 31 and skin elements 32 cooperate together to define the outer, irregular, peripheral surface of the container 30, the container 30 being specifically designed to be received in a complementary shaped compartment in a military tank or the like for the storage of fuel. Usually, two such containers 30 are required in this particular vehicle.

Figure 2:
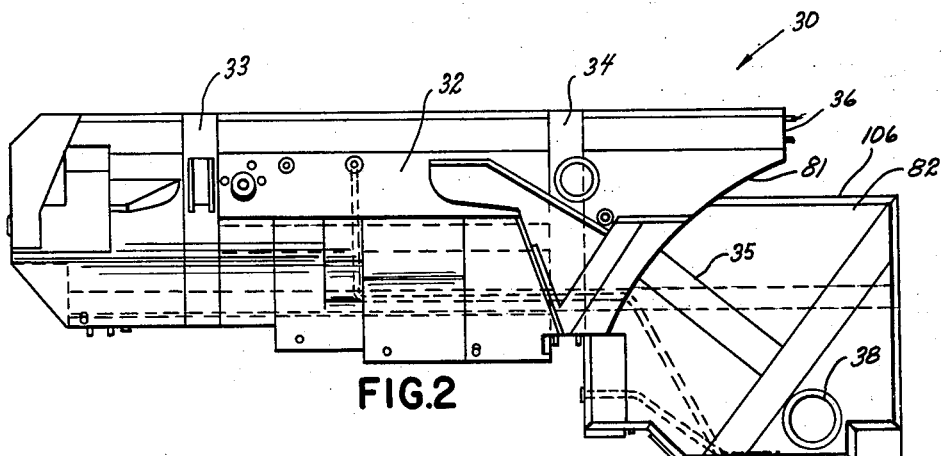
FIGURE 2 is an enlarged top view of the container illustrated in FIGURE 1.

Since the structures and methods of this invention are adapted to make irregularly shaped containers, such as the container 30 illustrated in FIGURES 1 and 2, as well as conventionally shaped containers, the specific details of the container construction 30 are illustrated in simplified form throughout the drawings in order to more fully understand the features of this invention, it being understood that the particular configuration of the container is merely a matter of choice, as the features of this invention can be applied individually or in various combinations thereof to form a container having any desired configuration.

Generally, the frame construction 31 comprises two main frame members 33 and 34 and two auxiliary frame members 35 and 36, the frame members 33–36 being interconnected together in a manner hereinafter described to form the rigid frame construction or unit 31. The skin elements or wall means 32 are secured to the frame construction 31 in a manner hereinafter described to complete the container 30 whereby the frame construction 31 provides the structural strength for the container 30. While the frame members 33–36 illustrated in FIGURES 1 and 2 respectively define at least part of the perimeters of irregular-shaped configurations, the structure and method of forming the same can be more readily understood by making reference to FIGURE 3 of the drawing, wherein the frame sections 33–36 are illustrated as defining the perimeters of substantially rectangular configurations.

Figures 19, 21:
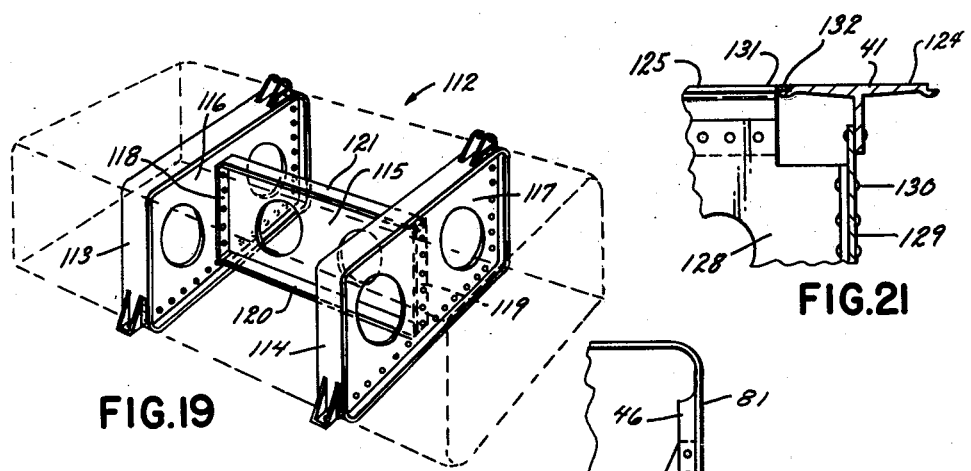
FIGURE 19 is a view similar to FIGURE 3 and illustrates another container of this invention.
FIGURE 21 is an enlarged, fragmentary, cross-sectional view of the container illustrated in FIGURE 20 and is taken on line 21—21 thereof.
Figures 18, 20:
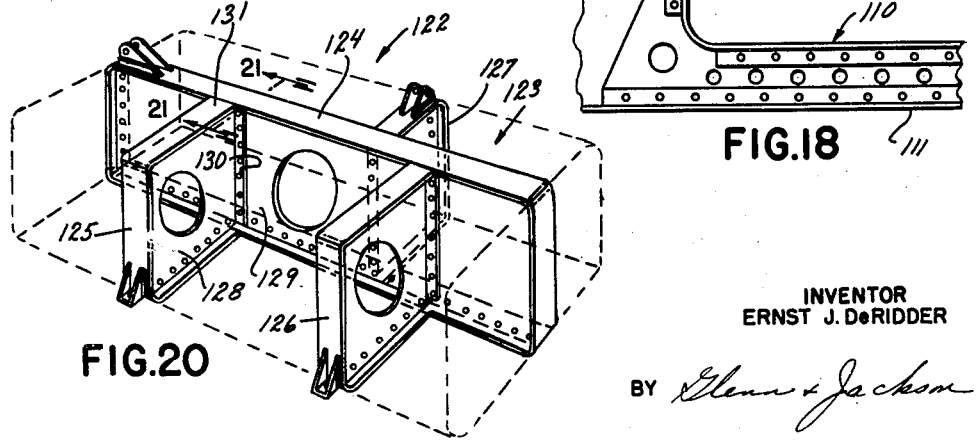
FIGURE 18 is a fragmentary, cross-sectional view of the container construction illustrated in FIGURE 17 and is taken substantially on line 18—18 thereof.
FIGURE 20 is a view similar to FIGURE 19 and illustrates still another embodiment of this invention.

However, it can be readily seen that the structures and methods of this invention are substantially the same whether they are utilized to form the irregular-shaped container illustrated in FIGURES 1 and 2 or a substantially symmetrical container, such as the rectangular containers illustrated in FIGURES 19 and 20 of the drawings.

Thus, while the container 30 illustrated in FIGURES 1 and 2 has an irregular outer contour, the container 30 basically comprises the frame construction 31 and the interconnected skin elements 32 in which various openings, such as 37 and 38, are provided to form inlets and outlets for filling and emptying the container 30.

The frame construction 31 is formed from the plurality of frame members 33–36 in the following manner.

As illustrated in FIGURE 12, a length of frame member stock 39 of this invention is formed in any suitable manner and from any suitable material, and, in the embodiment illustrated in the drawings, the frame member stock 39 is formed by extruding any suitable material, such as aluminum containing metal and the like, in a conventional extruding apparatus 40.

The extruded stock 39 comprises a substantially wide outer web 41 having a substantially flat outer surface 42 and a pair of opposed, thickened, parallel edges 43 and 44, the edges 43 and 44 respectively having grooves or channels 45 formed therein throughout their lengths and respectively facing outwardly from the web 41. A transverse web 46 is interconnected substantially medially to the outer web 41 at the inner surface 47 thereof and is disposed substantially perpendicularly to outer surface 42 of the web 41, the inner surface 47 of the web 41 tapering upwardly from each side of the transverse web 46 to the outer thickened edges 43 and 44.

Another type of frame member stock is illustrated in FIGURE 13 and is indicated by the reference numeral 48. The frame member stock 48 is substantially identical to the frame member stock 39 illustrated in FIGURE 12, except that a pair of parallel, plate-like flanges 49 are integrally connected to the outer surface 42 of the outer web 41 and extend substantially perpendicularly from the outer surface 42 throughout the length of the frame member stock 48.

Either the frame member stock 39 or the frame member stock 48 or both are utilized to form the frame members 33–36 of the frame construction 31 by cutting the same into appropriate lengths and bending the same so that the outer webs 41 of the bent frame members respectively define at least part of the perimeters of selected configurations as well as part of the outer peripheral surface of the container to be formed therefrom, the transverse webs 46 extending inwardly from the bent frame members.

For example, the frame member 33 is formed by joining together a plurality of frame member sections 50 and 51, FIGURES 3 and 14, cut from the frame member stock 39 and a plurality of frame member sections 52 and 53 cut from the frame member stock 48. If desired, the frame member sections 50–53 can be joined together in aligned relation by welding or the like to form one elongated frame member 33 which can be subsequently bent into the rectangular configuration illustrated in FIGURE 3 and have the abutting ends of the frame member sections 50 and 53 thereof secured together to form the entire perimeter of the selected configuration whereby the outer surface 42 of the outer web 41 of the frame member 33 will define part of the outer peripheral surface of the container 30 in a manner hereinafter described. Alternately, the frame member sections 50–53 could be bent separately into their appropriate configurations whereby the same can be subsequently secured together at their abutting ends to form the completed rectangular configuration illustrated in FIGURE 3.

In either method, at least a portion of the transverse webs 46 of the frame member sections 50–53 are cut away at predetermined locations along the length thereof, such as at 54, FIGURE 14, before the sections 50–53 are bent, whereby the cut-away portions 54 of the transverse webs 46 will be located at the critical bends subsequently provided therein when the same are bent into the desired configurations. By cutting away at least a portion of the webs 46 at the proper locations, the frame sections 50–53 can be readily bent at the desired locations along the lengths thereof.

When adjacent ends of adjacent frame member sections 50–53 are being secured together, such as by welding or the like, either before the sections 50–53 have been bent or thereafter, it has been found desirable to cut away at least a portion of the inner transverse webs 46 thereof at the abutting ends of the sections 50–53 to facilitate such securing operation. For example, the opposed ends of the transverse web 46 of the frame member section 52 illustrated in FIGURE 14 are cut away at 55 and 56, while the respective ends of the transverse webs 46 of the frame member sections 50 and 51 are cut away at 57 and 58 to facilitate the subsequent welding operation that secures together the frame member sections 50–52 by the welds 59 and 60. However, it is to be understood that the transverse webs 46 at the abutting ends of the adjacent frame member sections 50–53 can remain in their original form and be welded to each other to further secure the sections 50–53 together, if desired.

The frame member sections 52–53, formed from the member stock 48, have selected portions of the plate-like flanges 49 thereof removed before the frame member sections 52 and 53 are bent, whereby the remaining portions of the plate-like flanges 49 providing container mounting means in a manner hereinafter described that are located in the desired positions about the frame member 33. It is preferred that such mounting plates' or flanges 49 be located remote from the weld seams in the frame member, such as the welds 59 and 60 of FIGURE 14.

While the main frame member 33 has been illustrated as being formed from a plurality of frame member sections 50–53 formed from the frame member stocks 39 and 48, it is to be understood that the frame member 33 can be formed from a single length cut from the frame member stock 39 or the frame member stock 48, if desired. When the main frame member 33 is formed from a single length cut from the frame member stock 48, a considerable amount of the plate-like flanges 49 thereof must be removed before the single length thereof can be bent into the rectangular configuration illustrated in FIGURE 3. Similarly, when the main frame 33 is formed from a single length cut from the frame member stock 39, additional means must be provided for forming container mounting structure on the outer web 41 thereof in the desired locations. Thus, if no container mounting means is needed on a particular frame member, the same should be formed from the frame member stock 39 rather than the stock 49. However, when container mounting means are required on a particular frame member, it is preferred to form the same from a combination of lengths cut from the stocks 39 and 48 rather than just from the stock 49, to save material and labor in cutting away the flanges 49 in the areas where the same is not required.

In the embodiment illustrated in the drawings, the transverse webs 46 of the frame member sections 50–53 of the frame member 33, as well as the webs 46 of the frame members 34–36, have been provided with a plurality of apertures 61 passing transversely therethrough. Similarly, the remaining plate-like flanges 49 on the frame member sections 52 and 53 are provided with a plurality of apertures 62 passing transversely therethrough. Such apertures 61 and 62 can be formed in the frame member stock 39 and 48 before the same has been cut into the desired lengths or after as desired. Further, such apertures 61 and 62 can be formed in the appropriate frame member sections 50–53 after the same have been secured together to form the frame member 33, as desired.

After the main frame 33 has been constructed in the above manner, an appropriately shaped, rigidifying baffle means 64 is secured to the transverse web 46 thereof by a plurality of rivets or the like passing through suitable apertures formed in the baffle means 64 and the apertures 61 formed in the transverse web 46. The baffle means 64 as illustrated in FIGURE 3, completely fills the configuration defined by the main frame 33 and therefore, has a plurality of openings 65 formed therein for permitting the fuel in the container 32 to flow to either side of the baffle means 64 without restriction thereof. Also, the baffle means 64 may be suitably cut away at the bends in the frame member 33 so as to provide passage means through the container 30, the baffle means 64 being cut away at 66, FIGURE 14, to provide a passage means 67 with the cut out portion 54 of transverse web 46. In addition, the cut away portions 55–58, FIGURE 14, of the transverse web 46 of the frame member 33 cooperate with the outer edge of the baffle means 64 to provide such passage means.

However, it is to be understood that the baffle means 64 could completely close the configuration defined by the frame member 33 whereby the container 30 would be divided into separate compartments, as desired.

While the baffle means 64 has been illustrated as being riveted to the transverse web 46 of the frame member 33, it is to be understood that same could be welded or otherwise secured thereto, if desired. Further, while the baffle means 64 has been illustrated as a single plate, a plurality of brace members could be utilized in place of the baffle means 64, the purpose of the baffle means or brace members being to further rigidify the frame member 33 so that the same maintains its desired configuration when subjected to shocks and the like.

The frame member 34 is formed in substantially the same manner as the frame member 33, the frame member 34 requiring only one container mounting location and thereby being formed of only two frame member sections 68 and 69 respectively cut from the frame member stocks 39 and 48 and being joined together at the welds 70 and 71.

The main frame members 33 and 34 are secured together in such a manner that the skin elements or wall means 32, supported thereby and interconnected thereto in a manner hereinafter described, are not subject to any forces borne by either the main frame 33 or 34 or both. In the embodiment illustrated in FIGURE 3, the frame members 33 and 34 are interconnected together by an elongated frame member 72 formed from either the frame member stock 39 or the frame member stock 48. In the embodiment illustrated in the drawings, the frame member 72 is formed from the stock 39 and interconnected to the frame members 33 and 34 in any desired manner to rigidly interconnect the frame members 33 and 34 together in spaced relation.

For example, the outer webs 41 of the members 33 and 34 are respectively notched at 73 and 74 in the manner illustrated in FIGURES 3 and 9, whereby the opposed ends 75 and 76 of the frame member 72 are respectively received in the notches 73 and 74 of the frame members 33 and 34 and welded thereto throughout at least part of the perimeters of the notches 73 and 74.

Alternately, the outer web 41 of the frame member 72 can be cut away at the ends 75 and 76 thereof in the manner illustrated in FIGURES 10 and 11, whereby the projecting ends of the transverse web 46 of the frame member 72 can have the outer portions 77 thereof bent at right angles to abut the transverse webs 46 of the frame members 33 and 34 to be bolted or riveted thereto by fastening means 78. The outer ends 79 of the outer web 41 of the frame member 72 can also be welded to the outer webs 41 of the frame members 33 and 34 by welds 80, the welds 80 filling the grooves 45 in the outer webs 41 of the frame members 33 and 34, to provide a leak-proof structure.

Because the container 30 of FIGURES 1 and 2 has an irregular-shaped end 81 and a substantially small box-like section 82 extending from the lower portion of the end 81, the auxiliary frame members 35 and 36 are utilized to support the skin elements 32 in the proper positions to form the end 81 and the section 82.

The frame member 35 is formed from a single length cut from frame member stock 39 and is bent into the configuration illustrated whereby the opposed ends 83 and 84 thereof can be secured to the main frame 34 by the method illustrated in FIGURE 9 or FIGURE 10. Also, the frame member 35 can be secured to the main frame 34 by having a portion 85 of the baffle means 86 thereof appropriately bent and disposed flush against the baffle means 87 of the frame member 34, whereby the baffle means 86 and 87 are interconnected together by a plurality of rivets 88 or other suitable fastening means. If desired, the ends 83 and 84 of the outer web 41 of the frame member 35 can be secured to the outer web 41 of the frame member 34 by a simple welding operation, as illustrated in FIGURE 11, with or without interconnecting the transverse webs 46 thereof, as illustrated in FIGURE 11.

The frame member 36 is formed and connected to the main frame member 34 in any of the above manners, whereby the interconnected frame members 33–36 provide a rigid frame construction or unit.

To further rigidify the frame construction 31, a plurality of baffle stiffening means can be provided, as illustrated in FIGURES 6 and 7.

In particular, a plurality of extruded, substantially U-shaped metal members 90 can be secured along one or both sides of the various baffle means of the frame member 33–36 by a plurality of rivets 91 or other suitable fastening means.

Therefore, the frame construction 31 provides a rigid and substantially integral structure for the container 30, the frame construction being formed in a relatively simple and effective manner.

After the frame construction 31 has been made in the above manner, the skin elements or wall means 32 are secured thereto to complete the container structure 30 in the following manner.

A plurality of metal sheets, such as aluminum containing metal sheets having a thickness of between 0.125–0.090 inch, are each properly formed and shaped to form part of the desired contour of the container 30 and are secured to the frame members 33–36 and 72 by welding or the like.

Figure 4:
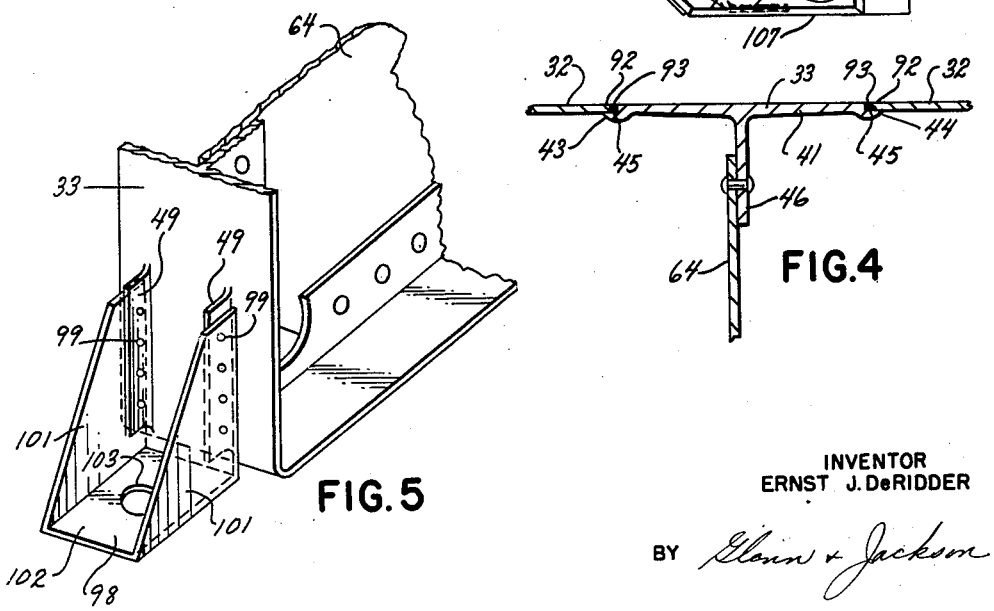
FIGURE 4 is an enlarged,, fragmentary, cross-sectional view of part of the container illustrated in FIGURE 3 and is taken on line 4—4 thereof.

In particular, as illustrated in FIGURE 4, the sheets or skin elements 32 abutting the frame member 33, as well as the other frame members 34–36 and 72, have their ends or edges 92 respectively received in the channels or grooves 45 of the outer web 41 thereof and welded therein by welds 93, whereby the skin elements 32 are secured to the frames 33–36 and 72 and cooperate with the outer surfaces 42 of the outer webs 41 of the frame construction 31 to form the entire outer peripheral surface of the container 30.

It is to be understood that the various contours of the outer peripheral surface of the container 30 disposed between the various pairs of adjacent frame members 33–36 and 72 can be formed from a plurality of skin elements 32 welded together at their abutting edges and to the frame members 33–36 and 72, in the manner illustrated in FIGURE 4. However, the wall means 32 disposed between adjacent pairs of frame members 33–36 and 72 could comprise single sheets suitably drawn and stamped to form the desired contour for that particular section of the container 30.

Since the sheets or skin elements 32 are relatively thin, the sheets 32 can be readily formed into the desired shape by simple stamping operations and the like, whereas the skin elements of prior known containers are relatively thick and cannot be readily formed to produce the desired contours, so that prior-known methods required time-consuming piecing and welding of the skin elements to produce a container having an irregular outer peripheral surface.

When adjacent skin elements or sheets 32 are welded together to define a portion of the outer peripheral surface of the container 30, it is preferred that the same be joined together at points remote from the more critical bends therein to prevent stress concentration at the welded seams of the skin elements 32, because it has been found that stress concentrations occur at the more critical bends in the skin elements 32 when the skin elements vibrate.

For example, as illustrated in FIGURE 8, the abutting ends or edges 94 of the skin elements 32a and 32b are joined together by the weld seam 95 at a point remote from the arcuate portion 96 of the skin element 32a, whereby the skin element 32a not only defines the arcuate portion 96 of the outer peripheral surface of the container 30, but also part of the straight portion 97 thereof, with the skin element 32b forming the remainder of the straight portion 97.

However, if it is found desirable to connect adjacent skin elements 32 together at a corner or critical bend in the outer peripheral surface of the container 30, the same can be connected in the manner set forth in FIGURE 8A, wherein the ends or edges 94' of the skin elements 32a' and 32b' are brought at right angles relative to each other and welded together by the weld 95'. To further secure together the ends 94' of the sheets 32a' and 32b' to compensate for the aforementioned stress concentration, a large filler weld 95a is added inside the corner.

Accordingly, the entire peripheral surface of the container 30 is formed by the properly shaped skin elements 32 and the outer surfaces 42 of the frame members 33–36 and 72 to complete the irregular contour of the container 30 illustrated in FIGURES 1 and 2.

After the container 30 has been formed in the above manner, and has suitable inlets and outlets and other appropriate or desired access means provided therein, the container 30 is adapted to be secured to the supporting structure of the desired vehicle in the following manner.

Figure 5:
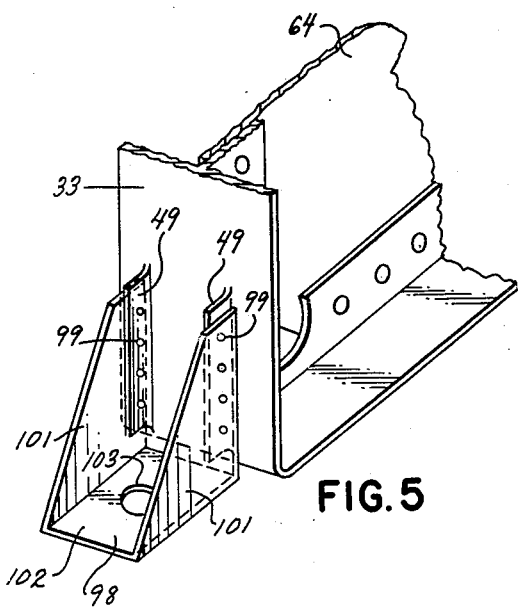
FIGURE 5 is an enlarged, fragmentary, perspective view of part of the frame construction of the container of FIGURE 3 and is taken substantially on line 5—5 thereof.

As illustrated in FIGURES 5 and 6, a plurality of mounting brackets 98 are respectively secured to the plate-like flanges 49 extending from any of the frame members 33–36 and 72 by a plurality of rivets 99. The brackets 98 are in turn secured to the supporting structure 100, FIGURE 3, of the particular vehicle or the like, by a plurality of bolts or other fastening means, whereby the container 30 is secured to the supporting structure 100 of the vehicle.

The brackets 98 can comprise any suitable configuration and may be formed in the manner illustrated in FIGURES 5 and 6, wherein each bracket 98 has a pair of spaced, parallel lugs 101 respectively secured to the plate-like flanges 49 of the particular frame member 33–36 and 72 by the rivets 99, the legs 101 of the brackets 98 either being received between the plate-like flanges 49 in the manner illustrated in FIGURE 6, or disposed about the plate-like flanges 49 in the manner illustrated in FIGURE 5. The lugs 101 of each bracket 98 are interconnected together at their outer ends by flat mounting portion 102 having a suitable opening 103 passing therethrough, so that the interconnected brackets 98 can be secured to the supporting structure 100 of the vehicle by bolts or the like.

However, as previously stated, the brackets 98 could comprise any desired configuration, as long as the same are suitable for interconnecting the container 30 to the supporting structure 100. Further, the brackets 98 could be eliminated and the container 30 could be directly secured to the supporting structure 100 solely by means of the plate-like flanges 49, if desired. Further, when the frame members are formed only from the frame member stock 39, the frame members can be attached to the desired supporting structure by merely connecting the outer webs 41 thereof to the supporting structure in any suitable manner.

When the container 30 is secured to the supporting structure 100 of the desired vehicle by the plate-like flanges 49, together with the brackets 98, or without the same, or solely by the outer webs 41 of the frame members, the rigid frame construction 31 prevents impact shocks, vibrations, and the like from being transferred from the vehicle to the particular welds 93 interconnecting the skin elements 32 to the frame members 33–36 and 72, because the welds 93 are disposed remote from the plate-like flanges 49, as illustrated in FIGURE 6, or other attaching means. The various baffle means and the like of the frame members 33–36, together with the stiffeners 90, or without the same, also tend to rigidify the particular frame members 33–36, whereby such impacts or shocks imposed by the vehicle upon the frame construction 31 are resisted by the baffle means or other rigidifying members spanning the configuration defined by the frame members 33–36. Thus, only the relatively rigid frame construction 31 receives such vehicle transferred forces and absorbs the same, whereby concentrated stresses are prevented from building up in the weld seams 93 of the skin elements 32 to cause fatigue and failure thereof.

In addition, the frame members 33–36 and 72 of the frame construction 31 effectively isolate certain of the skin elements 32 from other skin elements 32, so that if any vibrations are set up in the skin elements 32 in one part of the container 30, the same are not transmitted to the skin elements 32 in the other parts of the container 30 to adversely affect the same.

While the frame member 35, illustrated in simplified form in FIGURE 3, is utilized to form the overhanging section 82 of the container 30, illustrated in FIGURES 1 and 2, the section 82 can be formed in the manner illustrated in FIGURES 15 and 16, whereby a frame member 104 extends angularly from the main frame 34 and forms the bracing means for the end 81 of the container 30 and part of the section 82 thereof. The partial frame 104 is interconnected to another frame member 105 extending angularly across the overhanging section 82 of the container 30.

Since the overhanging section 82 of the particular container 33 illustrated in FIGURES 1 and 2 has a lower surface thereof which is progressively stepped downwardly from the edge 106 to the edge 107 thereof, the lower portions 108 and 109 of the frames 104 and 105 must be likewise stepped, as illustrated in FIGURE 16, to provide the proper contour to the section 82.

However, it has been found that the more bends that are formed in the frame members the weaker the resulting structure thereof, because the transverse webs 46 thereof must be cut away to permit bending of the frame members in the manner previously described. Accordingly, in forming irregularly shaped containers and the like, it is desirable to design the frame construction thereof in such a manner that the individual frame members thereof have a minimum of bends provided therein, while still permitting the resulting container to have the desired outer contour or configuration.

Figure 17:
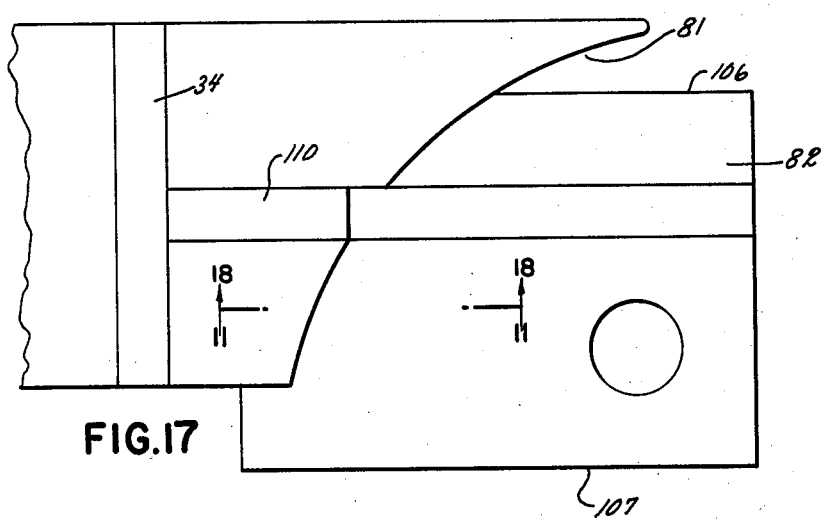
FIGURE 17 is a view similar to FIGURE 15 and illustrates another embodiment of this invention.

For example, the overhanging section 82 of the container 30 illustrated in FIGURES 1 and 2 can be formed in the manner illustrated in FIGURES 17 and 18, wherein a frame member 110 is interconnected to the frame member 34 and extends perpendicularly therefrom and forms part of the end 81 of the container 30 and spans the entire overhanging section 82 thereof. In this manner, even though the overhanging portion 82 has the surface thereof progressively stepped downwardly from the edge 106 thereof to the edge 107, the lower portion 111 of the frame member 110 is substantially straight, whereby the resulting frame 110 is relatively more rigid than the frame members 35 and 104 illustrated respectively in FIGURES 3 and 15 and is still utilized for the same purpose.

Accordingly, it can be seen that a container can be constructed having any desired outer peripheral contour or configuration by simply providing a rigid frame construction formed in accordance with the teachings of this invention to provide the backbone and shock absorbing means of such container and to which variously shaped skin elements can be secured to complete the outer peripheral surface thereof. Each frame construction is formed in such a manner that at least one of the frame members is so constructed and arranged that the same defines a particular cross-section of the desired container and part of the outer peripheral surface thereof.

While the main frame members 33 and 34 illustrated in FIGURE 3 are connected together by the rigid straight frame member 72, it is to be understood that the frame members 33 and 34 could be secured together in any other desired manner, so long as the skin elements 32 do not provide the sole means for connecting the same together.

For example, a simplified container 112 is illustrated in FIGURE 19 and includes two main frame members 113 and 114, similar to frame members 33 and 34 of FIGURE 3, interconnected together by an intermediate baffle means 115 connected to the baffle means 116 and 117 of the frame members 113 and 114. The baffle means 115 has the opposed end portions 118 and 119 thereof bent at right angles to the main plane of the baffle means 115 and respectively secured to the baffle means 116 and 117 of the frames 113 and 114 by rivets or the like. To further rigidify the baffle means 115, the other pair of opposed end portions 120 and 121 thereof are also bent at right angles to the main plane of the baffle means 115, whereby the bent portions 120 and 121 prevent buckling of the baffle means 115 should a force be imposed on one of the frame members 113 or 114 tending to force the same toward the other frame member 113 or 114. If desired, the adjacent edges of the bent portions 118–121 of the baffle means 115 could be welded or otherwise secured together to further rigidify the baffle means 115.

While the various containers of this invention have been illustrated as being provided with a plurality of main frame members each defining a complete cross-sectional configuration of the desired container, it is to be understood that a plurality of frame members could be provided and interconnected together to form a frame construction of a desired container without any of the frame members defining a complete cross-sectional configuration of the container. Also, one main frame member can be utilized to which a plurality of partial frames are secured by any of the above methods to form the frame construction of a container.

For example, as illustrated in FIGURES 20 and 21, another container 122 of this invention is illustrated and includes a frame construction 123 having a main frame member 124 defining the complete longitudinal cross-sectional configuration of the container 122 and having a plurality of auxiliary frame members 125, 126, and 127 secured thereto and disposed at substantially right angles therefrom. While the frame members 125–127 can be connected to the main frame member 124 in any desired manner, one method of interconnecting the same is illustrated in FIGURE 22, whereby the baffle means 128 of the frame member 125 is secured to the baffle means 129 of the main frame member 124 by a plurality of rivets 130 in substantially the same manner that the baffle means 86 of the frame member 35 of FIGURE 3 is secured to the baffle means 87 of the main frame member 34. However, the free ends 131 of the outer web 41 of the frame member 125 are secured to the outer web 41 of the main frame member 124 by welding at 132 without notching the outer web 41 of the main frame 124, as illustrated in FIGURE 9.

Therefore, it can be seen that this invention provides improved structures and methods for forming containers of any desired size and of any desired configuration in a relatively simple and effective manner, whereby undue stress concentrations are eliminated, so that the resulting container is long-lasting, light in weight, and relatively inexpensive.

Such containers are formed by providing a rigid frame construction which can be fabricated in the desired configuration and to which a plurality of skin elements can be secured to cooperate with the frame construction to provide the outer peripheral surface of the container, the rigid frame construction absorbing and isolating shocks and vibrations, whereby the skin elements of the containers can be formed from relatively thin and light-weight sheets of metal without sacrificing structural strength and durability as in prior known structures.

While the form of the invention now preferred has been disclosed as required by the statutes, other forms may be used, all coming within the scope of the claims which follow.

What is claimed is:

1. A container for fuel and the like comprising a first elongated bent frame member having laterally opposed edges and defining at least part of a perimeter of a first selected configuration and part of the outer peripheral surface of said container, a second elongated bent frame member having laterally opposed edges and defining at least part of a perimeter of a second selected configuration and part of said peripheral surface of said container, said second frame member having a pair of longitudinally opposed ends disposed substantially against one of said laterally opposed edges of said first frame member, said frame members each having an outer web provided with opposed edges and having a transverse web connected to the respective outer web and extending inwardly therefrom whereby each frame member is substantially uniform and continuous throughout its length, means interconnecting said frame members together to provide a rigid frame unit, and wall means connected to said edges of said frame members to define at least part of the remainder of said peripheral surface of said container.

2. A container as set forth in claim 1 wherein said means interconnecting said frame members together includes a pair of baffle means respectively secured to said transverse webs of said frame members and substantially spanning the configurations defined thereby, said baffle means being interconnected together to provide said rigid frame unit.

3. A container as set forth in claim 1 wherein said means interconnecting said frame members together includes the outer webs thereof.

4. A container as set forth in claim 1 wherein said means interconnecting said frame members together includes the transverse webs thereof.

5. A container for fuel and the like comprising a first elongated bent frame means having laterally opposed edges and defining at least part of a perimeter of a first selected configuration and part of the outer peripheral surface of said container, a second elongated bent frame means having a pair of longitudinally opposed ends connected to one of said laterally opposed edges of said first frame means to provide a rigid frame unit, said second frame means defining at least part of a perimeter of a second selected configuration disposed at an angle relative to said first configuration and defining part of the peripheral surface of said container, said frame means each having an outer web provided with opposed edges and having a transverse web connected to the respective outer web and extending inwardly therefrom whereby each frame means is substantially uniform and continuous throughout its length, and wall means connected to said opposed edges of said frame means to define at least part of the remainder of said peripheral surface of said container.

6. A frame construction for a container and the like comprising a first elongated bent frame means having laterally opposed edges and defining at least part of a perimeter of a first selected configuration, a second elongated bent frame means having laterally opposed edges and defining at least part of a perimeter of a second selected configuration, said second frame means having a pair of longitudinally opposed ends disposed against one of said laterally opposed edges of said first frame means said frame means each having an outer web and a transverse web interconnected to said outer web and extending inwardly therefrom whereby each frame means is substantially uniform and continuous throughout its length, a pair of baffle means respectively spanning said configurations and being respectively interconnected to said transverse webs of said frame means defining said configurations, and means interconnecting said baffle means together to thereby interconnect said frame means together to provide a rigid frame unit.

References Cited in the file of this patent

UNITED STATES PATENTS

| 2,003,808 | Mascuch | June 4, 1935 |
| 2,115,165 | Hathorn | Apr. 26, 1938 |
| 2,262,606 | Hardman | Nov. 11, 1941 |
| 2,358,190 | Theriault | Sept. 12, 1944 |
| 2,533,431 | Chausson | Dec. 12, 1950 |
| 2,648,454 | Dean | Aug. 11, 1953 |
| 2,668,634 | Arne | Feb. 9, 1954 |
| 2,818,191 | Arne | Dec. 31, 1957 |
| 2,951,613 | Hardigg | Sept. 6, 1960 |

FOREIGN PATENTS

| 466,367 | Germany | Oct. 4, 1928 |
| 543,151 | Belgium | Dec. 15, 1955 |